(12) United States Patent
Chen et al.

(10) Patent No.: US 11,398,009 B2
(45) Date of Patent: Jul. 26, 2022

(54) METHOD AND APPARATUS FOR PERFORMING OBJECT DETECTION BASED ON IMAGES CAPTURED BY A FISHEYE CAMERA AND ELECTRONIC DEVICE

(71) Applicant: Fujitsu Limited, Kawasaki (JP)

(72) Inventors: Shaoqi Chen, Beijing (CN); Qi Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 16/750,805

(22) Filed: Jan. 23, 2020

(65) Prior Publication Data

US 2020/0273145 A1    Aug. 27, 2020

(30) Foreign Application Priority Data

Feb. 22, 2019    (CN) .......................... 201910132115.9

(51) Int. Cl.
*G06K 9/36* (2006.01)
*G06T 3/00* (2006.01)
(Continued)

(52) U.S. Cl.
CPC .......... *G06T 3/0062* (2013.01); *G06K 9/6215* (2013.01); *G06K 9/6256* (2013.01);
(Continued)

(58) Field of Classification Search
CPC .......... G06K 9/00335; G06K 9/00362; G06K 9/00624; G06K 9/00771; G06K 9/00805;
(Continued)

(56) References Cited

U.S. PATENT DOCUMENTS 5,687,249 A * 11/1997 Kato ...................... G06T 7/579
  382/104
8,515,130 B2 * 8/2013 Aragane ................. G06T 5/006
  382/103
(Continued)

FOREIGN PATENT DOCUMENTS

CN    101155267    4/2008
CN    104636724    5/2015
(Continued)

OTHER PUBLICATIONS

Gao Xiuli etc., Fast fisheye camera calibration method using stereoscopic calibration board, Journal of Harbin Engineering University, vol. 37 No. 11, Nov. 2016.

*Primary Examiner* — Eric Rush
(74) *Attorney, Agent, or Firm* — Staas & Halsey LLP (57) ABSTRACT

This disclosure provides an apparatus and method for performing object detection based on images captured by a fisheye camera and an electronic device. The apparatus includes a memory and a processor coupled to the memory. The processor according to an embodiment is configured to: project an original image captured by the fisheye camera onto a cylindrical or spherical projection model, and perform reverse mapping to obtain at least two reversely mapped images, angles of view of the at least two reversely mapped images being towards different directions, detect objects in the reversely mapped images, respectively, and detect an object that is the same among the objects detected in the reversely mapped images. According to this disclosure, information in the wide field of view images obtained by capturing by the fisheye camera may be fully utilized.

6 Claims, 8 Drawing Sheets

(51) Int. Cl.
*G06K 9/62* (2022.01)
*G06V 10/22* (2022.01)
*G06V 10/147* (2022.01)
*G06V 20/52* (2022.01)
*G06T 7/20* (2017.01)
*G06T 7/70* (2017.01)
*G06V 10/24* (2022.01)
*G06V 10/422* (2022.01)
*H04N 13/111* (2018.01)

(52) U.S. Cl.
CPC .............. *G06T 3/0018* (2013.01); *G06T 7/20* (2013.01); *G06T 7/70* (2017.01); *G06V 10/147* (2022.01); *G06V 10/22* (2022.01); *G06V 10/247* (2022.01); *G06V 10/422* (2022.01); *G06V 20/52* (2022.01); *H04N 13/111* (2018.05); *B60R 2300/102* (2013.01); *G06V 2201/07* (2022.01); *G06V 2201/08* (2022.01)

(58) Field of Classification Search
CPC ........ G06K 9/20; G06K 9/2054; G06K 9/209; G06K 9/3233; G06K 9/36; G06K 9/38; G06K 9/46; G06K 9/4604; G06K 9/48; G06K 9/62; G06K 9/6215; G06K 9/6256; G06K 2009/363; G06K 2209/21; G06K 2209/23; G06T 3/0012; G06T 3/0018; G06T 3/005; G06T 3/0062; G06T 7/10; G06T 7/194; G06T 7/20; G06T 7/223; G06T 7/246; G06T 7/70; G06T 2207/10016; G06T 2207/30232; G06T 2207/30236; G06T 2207/30252; B60R 2300/102; H04N 5/23238; H04N 13/111; H04N 13/282; G06V 10/147; G06V 10/16; G06V 10/22; G06V 10/24; G06V 10/247; G06V 10/25; G06V 10/422; G06V 10/44; G06V 10/457; G06V 10/469; G06V 10/473; G06V 20/00; G06V 20/52; G06V 2201/07; G06V 2201/08
USPC ....... 382/100, 103, 104, 107, 159, 173, 190, 382/199, 203, 224, 276, 284, 291, 293, 382/294, 312, 325; 348/36, 148, 149; 345/629; 340/937

See application file for complete search history.

(56) References Cited

U.S. PATENT DOCUMENTS

| | | | |
|---|---|---|---|
| 9,437,001 | B2* | 9/2016 | Scholl .................... G06T 3/0018 |
| 10,733,705 | B2* | 8/2020 | Sakamoto .............. G06V 20/58 |
| 2008/0074489 | A1 | 3/2008 | Zhang et al. |
| 2011/0216158 | A1* | 9/2011 | Bigioi ................ H04N 5/23238 382/103 |
| 2014/0169638 | A1* | 6/2014 | Toribami ........... G06K 9/00342 382/107 |
| 2017/0026572 | A1* | 1/2017 | Baran ................ H04N 5/23238 |
| 2017/0140229 | A1* | 5/2017 | Ogata ..................... G06T 7/248 |
| 2017/0330337 | A1* | 11/2017 | Mizutani ................. G06T 7/337 |
| 2019/0012766 | A1* | 1/2019 | Yoshimi ............. H04N 5/23238 |
| 2020/0053393 | A1* | 2/2020 | Niamut .................... G06T 7/90 |
| 2020/0137379 | A1* | 4/2020 | Tsunashima ............ G06T 7/593 |

FOREIGN PATENT DOCUMENTS

| | | |
|---|---|---|
| CN | 107154152 | 9/2017 |
| KR | 101697211 | 1/2017 |

* cited by examiner

METHOD AND APPARATUS FOR PERFORMING OBJECT DETECTION BASED ON IMAGES CAPTURED BY A FISHEYE CAMERA AND ELECTRONIC DEVICE

CROSS-REFERENCE TO RELATED APPLICATIONS

This application is based on and hereby claims priority to Chinese Application No. 201910132115.9, filed Feb. 22, 2019, in the State Intellectual Property Office of China, the disclosure of which is incorporated herein by reference.

TECHNICAL FIELD

This disclosure relates to the field of information technologies, and in particular to a method and apparatus for performing object detection based on images captured by a fisheye camera and an electronic device.

BACKGROUND

Compared with traditional cameras, a fisheye camera has a wider field of view (FOV) and is capable of capturing more information on the environment. For example, the fisheye camera may achieve a field of view of 120 degrees or more, even more than 180 degrees.

However, a fisheye camera also has some limitations. For example, the closer to an edge of an image, the more severe the deformation. Therefore, when a road is photographed by using a fisheye camera, lane lines and vehicles tend to be severely distorted, making image processing difficult, and it is difficult to accurately calculate velocities of the vehicles based on the result of the image processing.

For the above reasons, current intelligent traffic systems (ITSs) usually use conventional cameras for video surveillance.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a case of capturing an image with a fisheye camera, an edge portion of the image captured by the fisheye camera is usually cut off, and only a central part of the image is retained and used for image processing. Thus, information on the edge part of the image is discarded, making it difficult to produce an advantage of wide field of view of a fisheye camera.

The embodiment of this disclosure provides a method and apparatus for performing object detection based on images captured by a fisheye camera and an electronic device, in which when an image captured by the fisheye camera is reversely mapped, at least two reversely mapped images with angles of view facing towards different directions are formed, and objects are detected based on the reversely mapped images. Hence, it is not necessary to cut off the images captured by the fisheye camera, and information in the wide field of view images obtained by capturing by the fisheye camera may be fully utilized.

According to an embodiment of this disclosure, there is provided an apparatus for performing object detection based on images captured by a fisheye camera. The apparatus includes a memory and a processor coupled to the memory where the processor is configured to project original images captured by the fisheye camera onto a cylindrical or spherical projection model, and perform reverse mapping to obtain at least two reversely mapped images, angles of view of the at least two reversely mapped images being towards different directions, detect objects in the at least two reversely mapped images respectively, and detect an object that is the same among the objects detected in the at least two reversely mapped images.

According to an embodiment of this disclosure, there is provided a method for performing object detection based on images captured by a fisheye camera.

The method includes projecting original images captured by the fisheye camera onto a cylindrical or spherical projection model, and performing reverse mapping to obtain at least two reversely mapped images, angles of view of the at least two reversely mapped images being towards different directions.

The method also includes detecting objects in the at least two reversely mapped images respectively; and detecting an object that is the same among the objects detected in the at least two reversely mapped images.

According to an embodiment of this disclosure, there is provided an electronic device, including the apparatus described above.

Using a non-limiting example, an advantage of the embodiments of this disclosure exists in that when an image captured by the fisheye camera is reversely mapped, at least two reversely mapped images with angles of view facing towards different directions are formed, and objects are detected based on the reversely mapped images. Hence, it is not necessary to cut off the images captured by the fisheye camera, and information in the wide field of view images obtained by capturing by the fisheye camera may be fully utilized.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, blocks or components but does not preclude the presence or addition of one or more other features, integers, blocks, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Embodiment 1

Embodiment 1 provides a method for performing object detection, in which the object detection is performed based on images captured by a fisheye camera.

Figure 1:
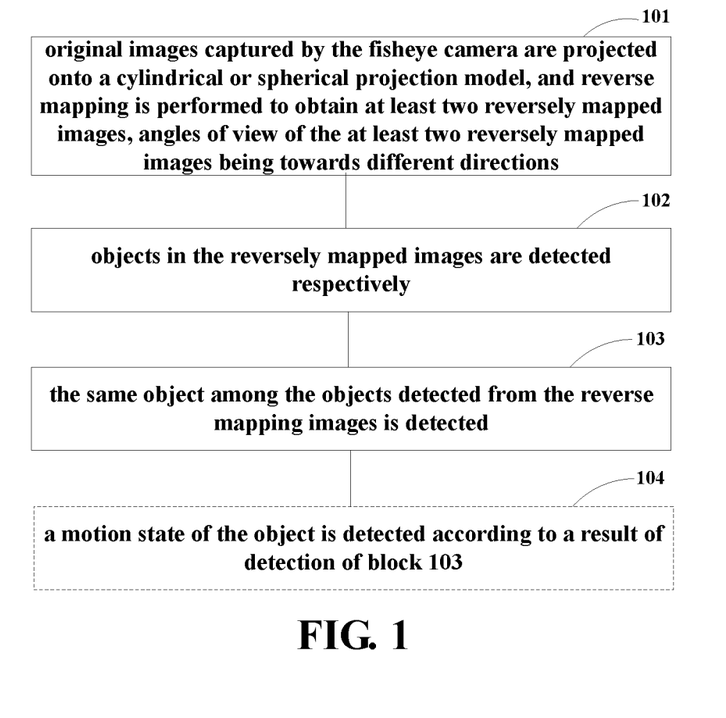
FIG. 1 is a flowchart of the method for performing object detection according to an embodiment of this disclosure.

FIG. 1 is a flowchart of the method for performing object detection of this embodiment. As shown in FIG. 1, the method includes:

block 101: original images captured by the fisheye camera are projected onto a cylindrical or spherical projection model, and reverse mapping is performed to obtain at least two reversely mapped images, angles of view of the at least two reversely mapped images being towards different directions;

block 102: objects in the reversely mapped images are detected respectively; and block 103: the same object among the objects detected from the reverse mapping images is detected.

According to this embodiment, when an image captured by the fisheye camera is reversely mapped, at least two reversely mapped images with angles of view facing towards different directions are formed, and objects are detected based on the reversely mapped images. Hence, it is not necessary to cut off the images captured by the fisheye camera, and information in the wide field of view images obtained by capturing by the fisheye camera may be fully utilized.

In this embodiment, the original images captured by the fisheye camera may be from images captured by the fisheye camera in a real-time manner, or may be from images captured by the fisheye camera stored in a storage device, which is not limited in this embodiment.

In this embodiment, the subject captured by the fisheye camera may be a road or an indoor environment, and the object may be a person or a vehicle in the image. In the following description of this embodiment, the fisheye camera is used for traffic surveillance, the object is a traffic lane, and the object is a vehicle or the like on a traffic lane. However, this embodiment is not limited thereto, and the fisheye camera may also be used for capturing other subjects, and the object may also be other objects in the image.

In block 101 of this embodiment, the original images captured by the fisheye camera may be mapped onto the cylindrical model or the spherical model, so that the original images may be corrected. Reference may be made to the related art for a particular method for mapping the original images onto the cylindrical surface model or the spherical surface model, such as mapping the original images to the cylindrical surface model or the spherical surface model in performing image stitching.

In one implementation of this embodiment, the original images may be mapped to the cylindrical surface model in block 101, the cylindrical surface model may be, for example, a semi-cylindrical model, thus, images in the original images in a range of field of view of 180 degrees may be mapped onto the semi-cylindrical model.

Furthermore, in this embodiment, before the original images are mapped onto the semi-cylindrical surface model, sizes of the original images may be adjusted so that the adjusted sizes are in conformity with formula (1) below:

$$\frac{width}{height} = \frac{HFOV/(180°) \cdot \pi}{\tan(UVFOV) + \tan(DVFOV)}; \quad (1)$$

where, width denotes a width of the adjusted image, i.e. a size in the horizontal direction, height denotes a height of the adjusted image, i.e. a size in the vertical direction perpendicular to the horizontal direction, HFOV is a horizontal field of view of an original image, i.e. a field of view in a width direction, UVFOV is a first field of view of the original image in the vertical direction, and DVFOV is a second field of view of the original image in the vertical direction; UVFOV and DVFOV respectively indicate opening angles of a central optical axis of a lens of the fisheye camera with respect to an upper and lower edges of the original image.

Furthermore, the 180 degree in formula (1) refers to a center angle to which a cross-sectional arc of the semi-cylindrical model corresponds; and when the semi-cylindrical model is replaced with a whole cylindrical model, a center angle to which a cross-sectional arc of the cylindrical model corresponds is 360 degrees, hence, 180 degrees in formula (1) may be replaced with 360 degrees.

Figure 2:
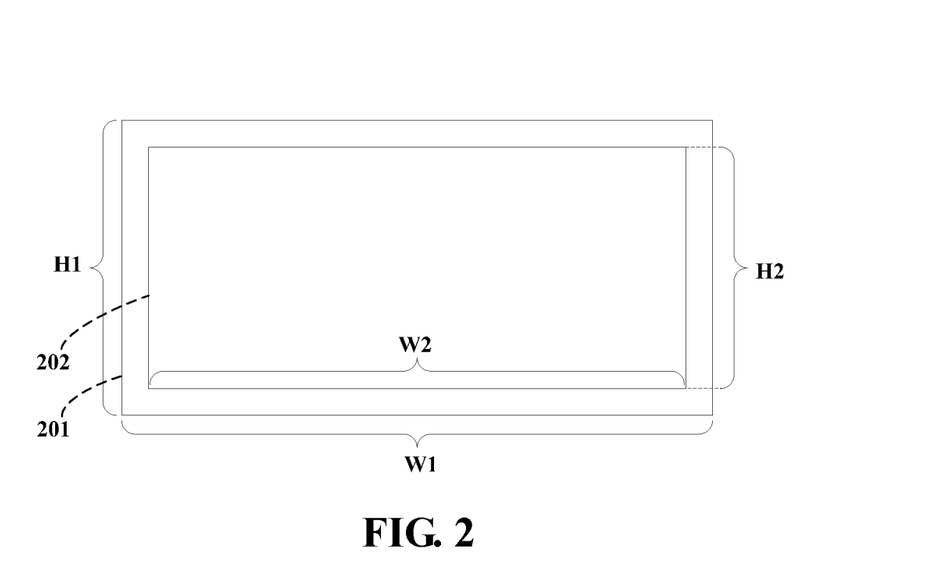
FIG. 2 is a schematic diagram of an image with an original image and size being adjusted according to an embodiment of this disclosure.

FIG. 2 is a schematic diagram of an image with an original image and size being adjusted, wherein w1 and h1 denote a width and height of the original image 201, respectively, and w2 and h2 denote a width and height of an image 202 with a size being adjusted, respectively; where, w2 and h2 are equal to width and height in formula (1).

In the following description of this embodiment, description shall be given by taking a scheme in which the size adjustment is performed as an example. However, this embodiment may not be limited thereto. For example, the above-described size adjustment may not be performed, and in a case where the size adjustment is not performed, the description for the size-adjusted image in the following description may be applicable to description of the original images.

In block 101 of this embodiment, the image projected onto the cylindrical projection model may be reversely mapped, that is, the image on the cylindrical projection model may be projected onto a plane.

Figure 3:
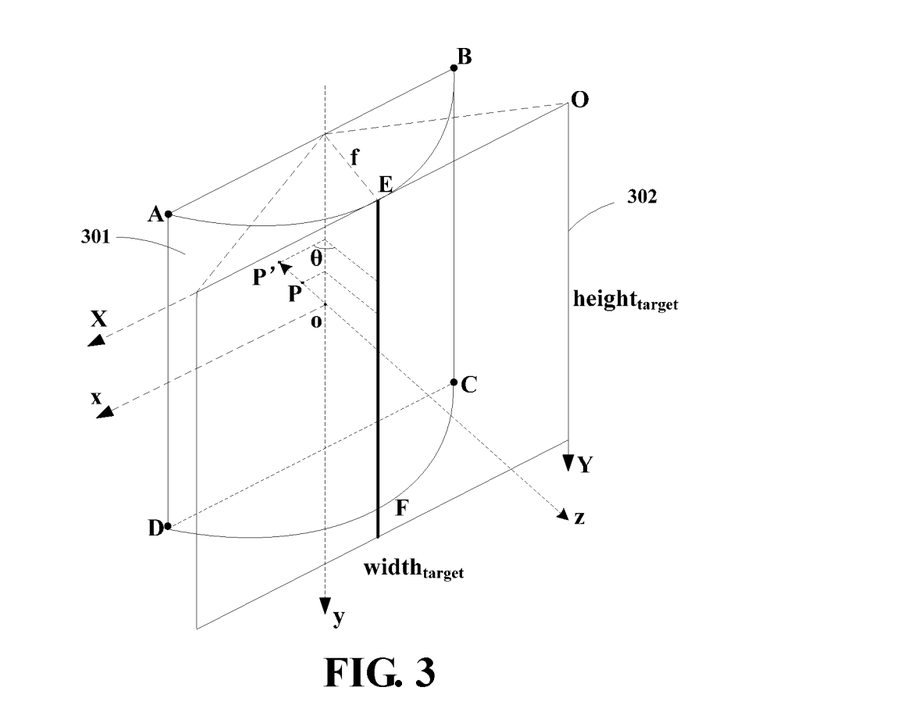
FIG. 3 is a schematic diagram of an image on a cylindrical projection model and an image obtained by reverse mapping according to an embodiment of this disclosure.

FIG. 3 is a schematic diagram of the image on the cylindrical projection model and an image obtained by reverse mapping. As shown in FIG. 3, the image 301 on the cylindrical projection model is AEBCFD; a projection surface of the cylindrical projection model is a semi-cylindrical surface, the planar image obtained by reverse mapping is 302, the a ABCD is parallel to a plane of the image 302.

As shown in FIG. 3, O is the center point of the plane ABCD, which is also the coordinate origin of a coordinate system xyz, the x-axis is parallel to AB, the y-axis is parallel to AD, and the z-axis is perpendicular to the plane ABCD. P(u,v) is any point on the image 301. An intersection of the line connecting O and P and the image 302 is P'(X, Y), that is, P'(X, Y) is a point on the image 302 corresponding to P(u, v). An included angle between a perpendicular segment line from P' to the y-axis and the z-direction is θ.

FIG. 3 is in conformity with formulae (2) and (3) below:

$$\tan \theta = (X - width_{target}/2)/f, \quad (2)$$

$$\frac{v - h_1}{Y - \frac{height_{target}}{2}} = \frac{f}{\sqrt{\left(X - \frac{width_{target}}{2}\right)^2 + f^2}}; \quad (3)$$

where, $height_{target}$ and $width_{target}$ respectively denote a height and width of the planar image 302, f denotes a focal lengths of the fisheye camera, and $h_1$ denotes a height of the above adjusted image.

In a case where the height and width of the planar image 302 are given, there exists a relationship between P'(X,Y) and P(u,v), which is shown by formulae (4) and (5) below:

$$u = f \cdot \theta + \text{offset} * width = f \cdot \tan^{-1}\left(\frac{X - \frac{width_{target}}{2}}{f}\right) + \text{offset} * width, \quad (4)$$

$$v = \frac{f \cdot \left(Y - \frac{height_{target}}{2}\right)}{\sqrt{\left(X - \frac{width_{target}}{2}\right)^2 + f^2}} + h_1. \quad (5)$$

The above formulae are limited by conditions: offset∈(0, 1), $$\frac{HFOV}{180°} \cdot \pi \cdot f = width;$$

where, width denotes the width of the above size-adjusted image.

In the present embodiment, offset appears in formula (4), which indicates an offset related the widths of the original images.

In this embodiment, in performing the reverse mapping based on the above formulae (2)-(4), by adjusting values of the offset, planar images with angles of view towards different directions in the width direction may be obtained. For example, if a value of offset is set to be greater than a first value, a first planar image may be obtained, and if a value of offset is set to be less than the first value, a second planar image may be obtained, angles of view of the first planar image and the second planar image facing towards different directions in the width direction.

In one implementation, when a value of offset is the first value, the angle of view of the planar image in the width direction faces towards a center position in the width direction; when a value of offset is less than the first value, the angle of view of the planar image in the width direction is left to the center position in the width direction; and when a value of offset is great than the first value, the angle of view of the planar image in the width direction is right to the center position in the width direction.

For example, the first value may be 0.5, when a value of offset is less than the first value, the value of offset may be 0.45, and when a value of offset is great than the first value, the value of offset may be 0.55.

Figure 4:
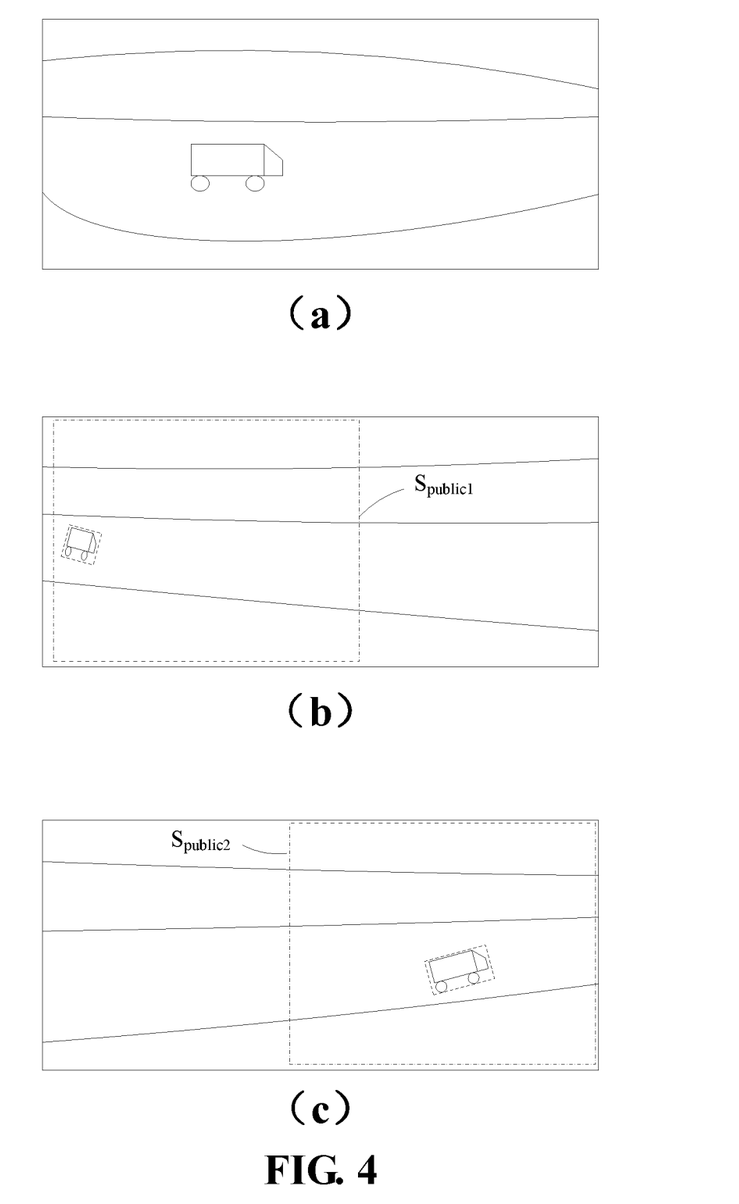
FIG. 4 is a schematic diagram of planar images obtained by reverse mapping at different values of an offset according to an embodiment of this disclosure.

FIG. 4 is a schematic diagram of planar images obtained by reverse mapping at different values offset. In FIG. 4, (a) denotes the planar image when the value of offset is the first value, (b) denotes the planar image when the value of offset is less than the first value, and (c) denotes the planar image when the value of offset is greater than the first value. The original images to which the planar images in FIG. 4 correspond are as shown in the original images 201 in FIG. 2.

As shown in FIG. 4, in this embodiment, offset to which (a), (b) and (c) correspond may be 0.5, 0.45, and 0.55, respectively, and it may be of other values.

Furthermore, in this embodiment, an offset 1 related to the height of the original images may be set in formula (5), and by adjusting offset1, at least two reversely mapped images with angles of vies towards different directions in the height direction may be obtained.

In one implementation, in performing reverse mapping in block 101, the offset may be adjusted to obtain at least two reversely mapped images, and/or offset 1 may be adjusted to obtain at least two reversely mapped images.

Furthermore, in the above description of this embodiment, in the case of projecting the original images onto the cylindrical projection model, reverse mapping is performed and at least two reversely map images are obtained. However, this embodiment is not limited thereto. For example, in the case of projecting the original images onto a spherical projection model, reverse mapping may also be performed and at least two reversely mapped images may be obtained.

In the following description of this embodiment, description shall be given by taking "adjusting the offset to obtain two reversely mapped images" as an example, and processing in other cases may be similar thereto.

In block 102 of this embodiment, objects in the reversely mapped images may be separately detected for the at least two reversely mapped images generated in block 101, and thus, for the reversely mapped images, there are corresponding target detection results. For example, for (b) and (c) in FIG. 4, objects therein are respectively detected.

In one implementation, the objects in the reversely mapped images may be detected based on a method of foreground and background detection, or the objects in the reversely mapped images may be detected based on the classifier, or the two detection methods are combined. For example, the object detected in the method of foreground and background detection and the target detected based on the classifier are fused to obtain a final object detection result.

Figure 5:
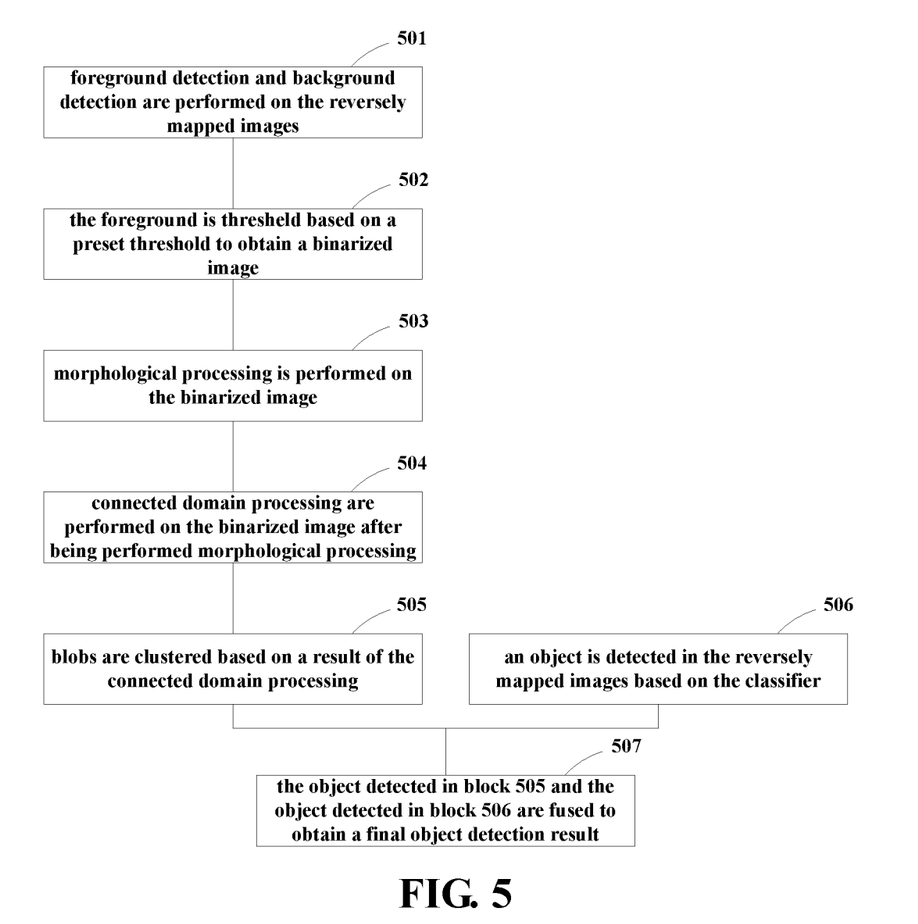
FIG. 5 is a flowchart of the method for performing object detection according to an embodiment of this disclosure.

FIG. 5 is a flowchart of the method for performing object detection of this embodiment. As shown in FIG. 5, for the reversely mapped images, the method for performing object detection may include:

block 501: foreground detection and background detection are performed on the reversely mapped images; for example, the foreground detection and background detection may be performed by using a Vibe algorithm;

block 502: the foreground is threshold based on a preset threshold to obtain a binarized image; for example, pixels in the foreground with pixel values greater than or equal to the threshold are set as white pixels, and pixels in the foreground with pixel values less than the threshold value are set as black pixels, so as to obtain the binarized image;

block 503: morphological processing is performed on the binarized image, and regions with a relatively small number of pixels in the binarized image are removed, so as to obtain at least one pixel set (blob);

block 504: connected domain processing are performed on the binarized image after being performed morphological processing, so as to merge adjacent pixel sets into relatively large pixel set;

block 505: blobs are clustered based on a result of the connected domain processing; for example, pixel sets with center distances less than a certain threshold are clustered into a pixel cluster, one pixel cluster being taken as a detected object;

block 506: an object is detected in the reversely mapped images based on the classifier; the classifier may be a classifier obtained based on target training, for example, the classifier may be a classifier based on graphics training of a vehicle; hence, a vehicle may be detected from the reversely mapped images; and the classifier may detect based on, for example, a histogram of oriented gradient (HOG) feature; and block 507: the object detected in block 505 and the object detected in block 506 are fused to obtain a final object detection result; for example, a contour frame Bbox1 of an object 1 detected in block 505 is compared with a contour frame Bbox2 of an object 2 detected in block 506, and when an intersection-over-union (IoU) of Bbox1 to and Bbox2 exceeds a certain threshold Tmerge, it is determined object 1 is the final object, otherwise, it is not determined object 1 is the final object.

In FIG. 5, the objects in the reversely mapped images are detected based on the method of foreground and background detection in blocks 501-505, the objects in the reversely mapped images are detected based on the classifier in block 506, and in block 507, they are fused for processing. Reference may be made to the related art for more detailed description of the blocks in FIG. 5. Furthermore, it should be noted that FIG. 5 is an example only, and other methods may be used in block 102 to detect the objects in the reversely mapped images.

In block 103 of this embodiment, the same target may be detected from the objects detected in the reversely mapped images.

Figure 6:
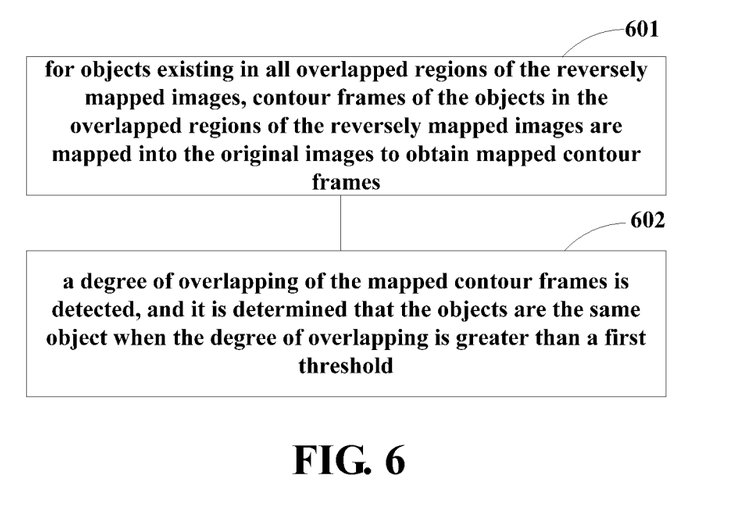
FIG. 6 is a flowchart of a method for detecting the same object according to an embodiment of this disclosure.

FIG. 6 is a flowchart of a method for detecting the same object of this embodiment. As shown in FIG. 6, the method may include:

block 601: for objects existing in all overlapped regions of the reversely mapped images, contour frames of the objects in the overlapped regions of the reversely mapped images are mapped into the original images to obtain mapped contour frames; and block 602: a degree of overlapping of the mapped contour frames is detected, and it is determined that the objects are the same object when the degree of overlapping is greater than a first threshold.

The method for detecting the same object shall be described below by taking the images in FIG. 4 as examples.

As shown in FIG. 4, a region $S_{public1}$ in (b) and a region $S_{public2}$ in (c) denote an overlapped region of (b) and (c), i.e. a public region.

Assuming that M objects are detected in (b) in FIG. 4, a contour frame of an i-th object may be denoted as $box_i^{view1}$, and pixels of a geometric center of the contour frame may be denoted as $c_i^{view1}$; where, i=1, 2, . . . , M, M being a natural number.

In this embodiment, a mark may be set for each object to indicate whether the object is located in the region $S_{public1}$. For example, a mark $F_i^{Spublic1}$ may be used to indicate whether an i-th object is located in the region $S_{public1}$. For example, when $F_i^{Spublic1}$ is 0, it indicates that the i-th object is located out of the region $S_{public1}$, and when $F_i^{Spublic1}$ is 1, it may indicate that the i-th object is located in the region $S_{public1}$.

In this embodiment, the number of objects in the region $S_{public1}$ may be determined by the mark $F_i^{Spublic1}$; for example, the number of objects in the region $S_{public1}$ is k, and contour frames of the k objects are denoted as $box_i^{Spub1}$; where, i=1, 2, . . . , k, k being a natural number.

Assuming that total N objects are detected in (c) of FIG. 4, bounding boxes of the objects may be denoted as $box_j^{view2}$, and pixels of geometric centers of the contour frames may be denoted as $c_j^{view2}$; where, j=1, 2, ... N, N being a natural number.

In this embodiment, a mark may be set for each object to indicate whether the object is located in the region $S_{public2}$. For example, a mark $F_j^{Spublic2}$ may be used to indicate whether a j-th object is located in the region $S_{public2}$. For example, when $F_j^{Spublic2}$ is 0, it indicates that the j-th object is located out of the region $S_{public2}$, and when $F_i^{Spublic2}$ is 1, it may indicate that the j-th object is located in the region $S_{public2}$.

In this embodiment, the number of objects in the region $S_{public2}$ may be determined by the mark $F_j^{Spublic2}$; for example, the number of objects in the region $S_{public2}$ is p, and contour frames of the p objects are denoted as $box_j^{Spub2}$; where, j=1, 2, ..., p, p being a natural number.

In this embodiment, the bounding $box_i^{Spub1}$ of the object in the region $S_{public1}$ of (b) and the bounding $box_j^{Spub2}$ of the object in the region $S_{public2}$ of (c) in FIG. 4 are respectively mapped to the original image 201, so as to respectively form bounding boxes $box_i^{Spub1\prime}$ and $box_i^{Spub2\prime}$; where, i=1, 2, ..., k, and j=1, 2, ..., p.

In this embodiment, when a degree of overlapping of the bounding boxes $box_i^{Spub1\prime}$ and $box_i^{Spub2\prime}$ is greater than a threshold $T_{match}$, it is determined that the object in the contour frame $box_i^{Spub1\prime}$ and the object in the contour frame $box_i^{Spub2\prime}$ are the same object; for example, a match mark $F_{box_i}^{Spub1}$ of the i-th object and a match mark $F_{box_j}^{Spub2}$ of the j-th object are both set to be 1. The degree of overlapping may be expressed as, for example, an intersection-over-union (IoU).

Furthermore, in this embodiment, when the object in the contour frame $box_i^{Spub1}$ and the object in the contour frame $box_j^{Spub2}$ are the same object, which contour frame is set to be a preferential contour frame of the same object is set according to moving directions of the objects. For example, a direction in which an object moves from the left to the right of FIG. 2 is set to be a positive direction; otherwise, it is set to be an inverse direction. When the object moves in the positive direction, $box_j^{Spub2}$ is set to be the preferential bounding box, and $F_{box_i}^{Spub2}$ may be set to be 0, thereby performing another time of detection; moreover, when the object moves in the inverse direction, $box_i^{Spub1}$ may be set to be the preferential bounding box, and $F_{box_i}^{Spub1}$ may be set to be 0, thereby performing another time of detection.

In this embodiment, the determination as to whether the object moves in the positive direction or the inverse direction may be performed, for example, according to a moving trajectory of the object in images in a period of time, and reference may be made to the related art for a particular method.

In this embodiment, as shown in FIG. 1, the method may further include:

block 104: a motion state of the object is detected according to a result of detection of block 103.

In block 104 of this embodiment, when it is determined that the objects detected in the reversely mapped images are the same object, motion velocities of the object are calculated respectively based on the reversely mapped images, and the motion state of the object is detected according to a difference between the motion velocities of the object calculated respectively based on the reversely mapped images.

For example, when the object in the contour frame $box_i^{Spub1}$ and the object in the contour frame $box_j^{Spub2}$ are the same object, such as a vehicle, a moving velocity of the object in the contour frame $box_i^{Spub1}$, for example, v1, may be calculated based on (b) in FIG. 4, a moving velocity of the object in the contour frame $box_j^{Spub2}$, for example, v2, may be calculated based on (c) in FIG. 4, a difference (v1−v2) therebetween is calculated, and it is determined that the moving velocities of the objects are reduced when the difference is greater than a threshold $T_{velocity}$.

In the above description of this embodiment, the motion states of the objects are of acceleration or deceleration; however, this embodiment is not limited thereto, and the motion states of the objects may be other.

The method of this embodiment shall be described below by way of an example.

Figure 7:
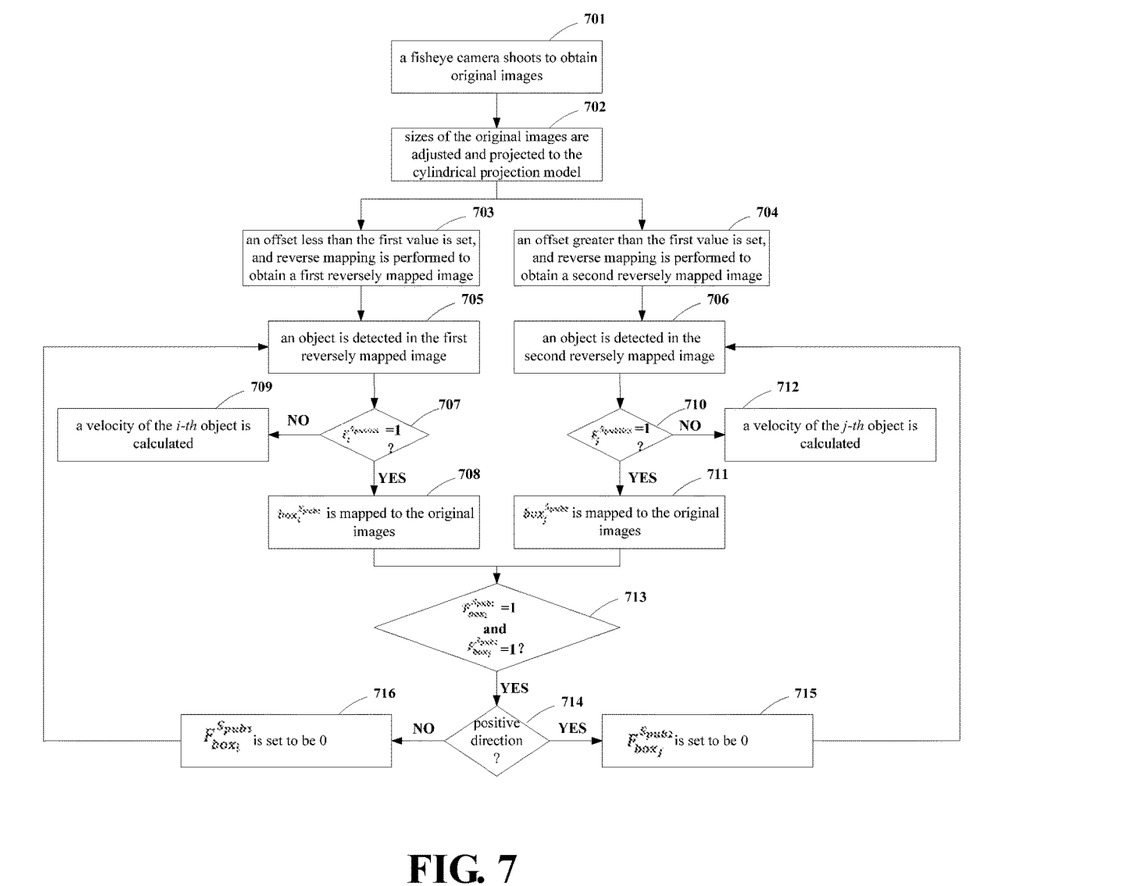
FIG. 7 is a flowchart of the method for performing object detection based on images captured by a fisheye camera according to an embodiment of this disclosure.

FIG. 7 is a flowchart of the method for performing object detection based on images captured by a fisheye camera of this embodiment, which corresponds to block 101, block 102 and block 103.

As shown in FIG. 7, the process includes:

block 701: a fisheye camera shoots to obtain original images;

block 702: sizes of the original images are adjusted, and the adjusted images are projected to the cylindrical projection model;

block 703: an offset less than the first value is set, and reverse mapping is performed to obtain a first reversely mapped image, such as (b) in FIG. 4;

block 704: an offset greater than the first value is set, and reverse mapping is performed to obtain a second reversely mapped image, such as (c) in FIG. 4;

block 705: an object is detected in the first reversely mapped image;

block 706: an object is detected in the second reversely mapped image;

block 707: it is determined whether the i-th object is located in the region $S_{public1}$, that is, whether $F_i^{Spublic1}$ is 1, entering into block 708 if it is determined "Yes", and entering into block 709 if it is determined "No";

block 708: $box_i^{Spub1}$ is mapped to the original images, so as to obtain $box_i^{Spub1\prime}$;

block 709: a velocity of the i-th object is calculated;

block 710: it is determined whether the j-th object is located in the region $S_{public2}$, that is, whether $F_j^{Spublic2}$ is 1, entering into block 711 if it is determined "Yes", and entering into block 712 if it is determined "No";

block 711: $box_j^{Spub2}$ is mapped to the original images, so as to obtain $box_j^{Spub2\prime}$;

block 712: a velocity of the j-th object is calculated;

block 713: it is determined whether the IoU of $box_i^{Spub1\prime}$ to $box_j^{Spub2\prime}$ is greater than the threshold $T_{match}$, that is, whether $F_{box_i}^{Spub1}$ and $F_{box_j}^{Spub2}$ are both 1, and entering into block 714 if it is determined "Yes";

block 714: it is determined whether the moving direction of the object is the positive direction, entering into block 715 if it is determined "Yes", and entering into block 716 if it is determined "No";

block 715: $F_{box_j}^{Spub2}$ is set to be 0, and turn back to block 706; and block 716: $F_{box_i}^{Spub1}$ is set to be 0, and turn back to block 705.

According to this embodiment, when an image captured by the fisheye camera is reversely mapped, at least two reversely mapped images with angles of view facing towards different directions are formed, and objects are detected based on the reversely mapped images. Hence, it is not necessary to cut off the images captured by the fisheye camera, and information in the wide field of view images obtained by capturing by the fisheye camera may be fully utilized.

Embodiment 2

Embodiment 2 provides an apparatus for performing object detection based on images captured by a fisheye camera. As a principle of the apparatus for solving problems is similar to that of the method in Embodiment 1, reference may be made to the implementation of the method in Embodiment 1 for implementation of the apparatus, with identical contents being not going to be described herein any further.

Figure 8:
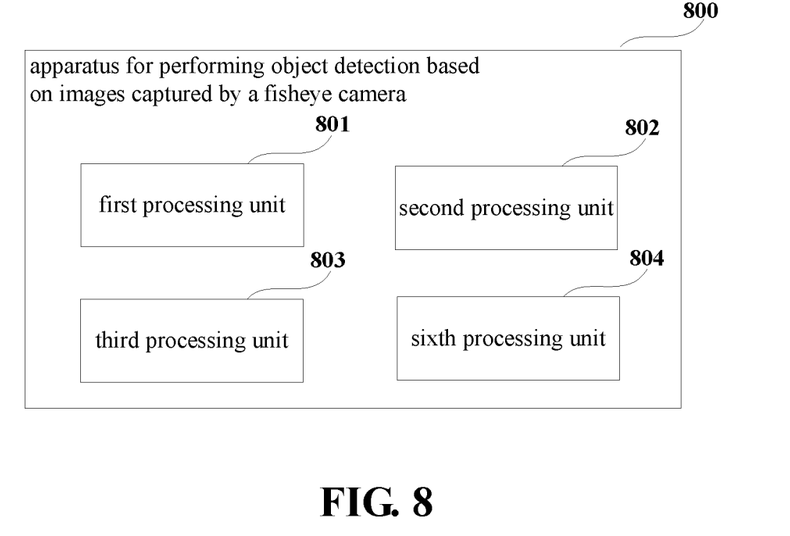
FIG. 8 is a schematic diagram of the apparatus for performing object detection based on images captured by a fisheye camera according to an embodiment of this disclosure.

FIG. 8 is a schematic diagram of the apparatus for performing object detection based on images captured by a fisheye camera of this embodiment. As shown in FIG. 8, an apparatus 800 includes:

a first processing unit 801 configured to project original images captured by the fisheye camera onto a cylindrical or spherical projection model, and perform reverse mapping to obtain at least two reversely mapped images, angles of view of the at least two reversely mapped images being towards different directions;

a second processing unit 802 configured to detect objects in the reversely mapped images respectively; and a third processing unit 803 configured to detect the same object in the objects detected in the reversely mapped images.

In performing the reverse mapping, the first processing unit 801 sets an offset related to a width and/or a height of an original image to be greater than a first value and less than the first value respectively, so as to obtain two reversely mapped images; wherein, when the offset is equal to the first value, the angles of view face a center of the width and/or height of the original image.

In this embodiment, the second processing unit 802 performs detection based on a foreground and a background, and/or performs detection based on a classifier.

Figure 9:
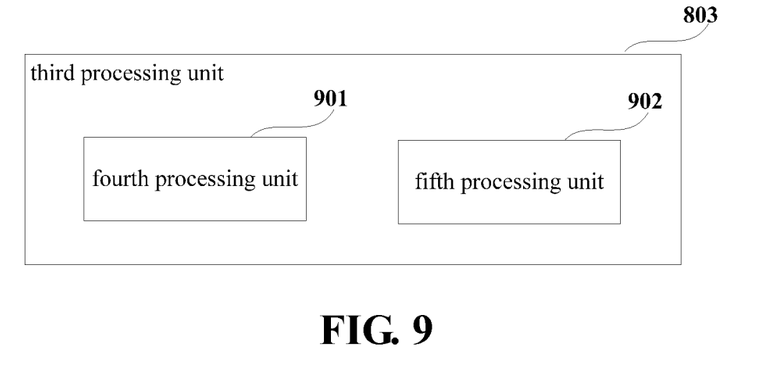
FIG. 9 is a schematic diagram of the third processing unit in the apparatus in FIG. 8.

FIG. 9 is a schematic diagram of the third processing unit 803 in the apparatus in FIG. 8. As shown in FIG. 9, the third processing unit 803 includes:

a fourth processing unit 901 configured to, for objects existing in overlapped regions of the reversely mapped images, map contour frames of the objects in the overlapped regions of the reversely mapped images into the original images to obtain mapped contour frames; and a fifth processing unit 902 configured to detect a degree of overlapping of the mapped contour frames, and determine that the objects are the same object when the degree of overlapping is greater than a first threshold.

As shown in FIG. 8, the apparatus 800 further includes:

a sixth processing unit 804 configured to detect a motion state of the object according to a result of detection of the third processing unit.

Figure 10:
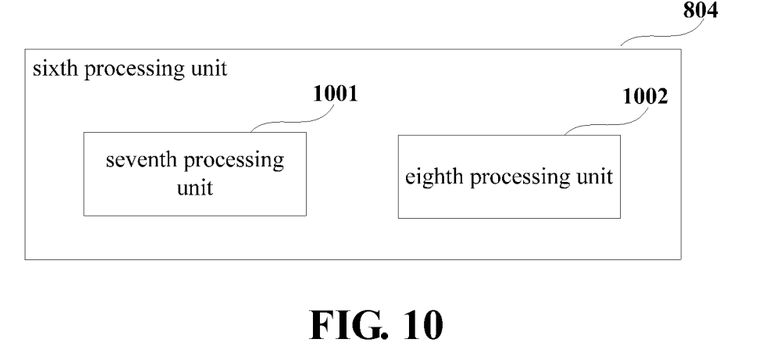
FIG. 10 is a schematic diagram of the sixth processing unit in the apparatus in FIG. 8.

FIG. 10 is a schematic diagram of the sixth processing unit 804 in the apparatus in FIG. 8. As shown in FIG. 19, the sixth processing unit 804 includes:

a seventh processing unit 1001 configured to, when it is determined that the objects detected in the reversely mapped images are the same object, calculate motion velocities of the object respectively based on the reversely mapped images; and an eighth processing unit 1002 configured to detect the motion state of the object according to a difference between the motion velocities of the object calculated respectively based on the reversely mapped images.

Reference may be made to corresponding blocks in Embodiment 1 for detained description of the units in this embodiment, which shall not be described herein any further.

According to this embodiment, when an image captured by the fisheye camera is reversely mapped, at least two reversely mapped images with angles of view facing towards different directions are formed, and objects are detected based on the reversely mapped images. Hence, it is not necessary to cut off the images captured by the fisheye camera, and information in the wide field of view images obtained by capturing by the fisheye camera may be fully utilized.

Embodiment 3

Embodiment 3 provides an electronic device. As a principle of the electronic device for solving problems is similar to that of the apparatus 800 in Embodiment 2, reference may be made to the implementation of the apparatus 800 in Embodiment 2 for implementation of the electronic device, with identical contents being not going to be described herein any further.

Figure 11:
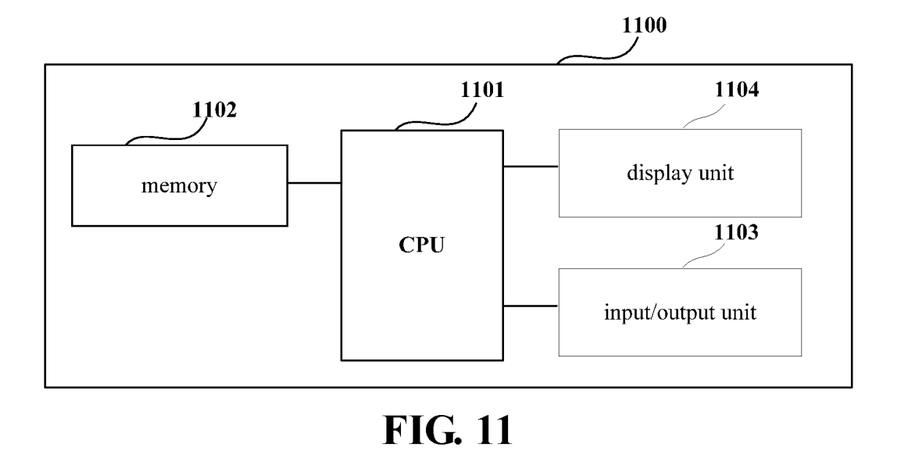
FIG. 11 is schematic diagram of the electronic device of according to an embodiment of this disclosure.

FIG. 11 is a schematic diagram of a structure of the electronic device of the embodiment of this disclosure. As shown in FIG. 11, an electronic device 1100 may include a central processing unit (CPU) 1101 and a memory 1102, the memory 1102 being coupled to the central processing unit 1101. The memory 1102 may store various data, and furthermore, it may store a program for data processing, and execute the program under control of the central processing unit 1101.

In one implementation, the functions of the apparatus 800 may be integrated into the central processing unit 1101, wherein the central processing unit 1101 may be configured to carry out the method described in Embodiment 1.

The central processing unit 1101 may be configured to perform control, so that the electronic device 1100 carries out the following method:

projecting original images captured by the fisheye camera onto a cylindrical or spherical projection model, and performing reverse mapping to obtain at least two reversely mapped images, angles of view of the at least two reversely mapped images being towards different directions; detecting objects in the reversely mapped images respectively; and detecting the same object in the objects detected in the reversely mapped images.

The central processing unit 1101 may further be configured to: in performing the reverse mapping, set an offset related to a width and/or a height of an original image to be greater than a first value and less than the first value respectively, so as to obtain two reversely mapped images; when the offset is equal to the first value, the angles of view face a center of the width and/or height of the original image.

The central processing unit 1101 may further be configured to: perform detection based on a foreground and a background, and/or perform detection based on a classifier.

The central processing unit 1101 may further be configured to: for objects existing in overlapped regions of the reversely mapped images, map contour frames of the objects in the overlapped regions of the reversely mapped images into the original images to obtain mapped contour frames; and detect a degree of overlapping of the mapped contour frames, and determine that the objects are the same object when the degree of overlapping is greater than a first threshold.

The central processing unit 1101 may further be configured to: detect a motion state of the object according to a result of detection of the third processing unit.

The central processing unit 1101 may further be configured to: when it is determined that the objects detected in the reversely mapped images are the same object, calculate motion velocities of the object respectively based on the reversely mapped images; and detect the motion state of the object according to a difference between the motion velocities of the object calculated respectively based on the reversely mapped images.

Furthermore, as shown in FIG. 11, the electronic device 1100 may include an input/output unit 1103, and a display unit 1104, etc.; functions of the above components are similar to those in the related art, which shall not be described herein any further. It should be noted that the electronic device 1100 does not necessarily include all the parts shown in FIG. 11, and furthermore, the electronic device 1100 may include parts not shown in FIG. 11, and the related art may be referred to.

According to this embodiment, when an image captured by the fisheye camera is reversely mapped, at least two reversely mapped images with angles of view facing towards different directions are formed, and objects are detected based on the reversely mapped images. Hence, it is not necessary to cut off the images captured by the fisheye camera, and information in the wide field of view images obtained by capturing by the fisheye camera may be fully utilized.

An embodiment of the present disclosure provides a computer storage medium, including a computer readable program code, which will cause an apparatus for performing object detection based on images captured by a fisheye camera or an electronic device to carry out the method for performing object detection based on images captured by a fisheye camera as described in Embodiment 1.

An embodiment of the present disclosure provides a computer readable program code, which, when executed in an apparatus for performing object detection based on images captured by a fisheye camera or an electronic device, will cause the apparatus for performing object detection based on images captured by a fisheye camera or the electronic device to carry out the fall detection method as described in Embodiment 1.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or blocks as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 8-10 may either correspond to software modules of procedures of a computer program, or correspond to hardware modules. Such software modules may respectively correspond to the blocks shown in FIGS. 1, 5, 6 and 7. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 8-10 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 8-10 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following implementations are further provided in this disclosure.

1. An apparatus for performing object detection based on images captured by a fisheye camera, the apparatus including:

a first processing unit configured to project original images captured by the fisheye camera onto a cylindrical or spherical projection model, and perform reverse mapping to obtain at least two reversely mapped images, angles of view of the at least two reversely mapped images being towards different directions;

a second processing unit configured to detect objects in the reversely mapped images respectively; and a third processing unit configured to detect the same object in the objects detected in the reversely mapped images.

2. The apparatus according to supplement 1, wherein, in performing the reverse mapping, the first processing unit sets an offset related to a width and/or a height of an original image to be greater than a first value and less than the first value respectively, so as to obtain two reversely mapped images;

wherein, when the offset is equal to the first value, the angles of view face a center of the width and/or height of the original image.

3. The apparatus according to supplement 1, wherein, the second processing unit performs detection based on a foreground and a background, and/or performs detection based on a classifier.

4. The apparatus according to supplement 1, wherein the third processing unit includes:

a fourth processing unit configured to, for objects existing in overlapped regions of the reversely mapped images, map contour frames of the objects in the overlapped regions of the reversely mapped images into the original images to obtain mapped contour frames; and a fifth processing unit configured to detect a degree of overlapping of the mapped contour frames, and determine that the objects are the same object when the degree of overlapping is greater than a first threshold.

5. The apparatus according to supplement 1, wherein the apparatus further includes:

a sixth processing unit configured to detect a motion state of the object according to a result of detection of the third processing unit.

6. The apparatus according to supplement 5, wherein the sixth processing unit includes:

a seventh processing unit configured to, when it is determined that the objects detected in the reversely mapped images are the same object, calculate motion velocities of the object respectively based on the reversely mapped images; and an eighth processing unit configured to detect the motion state of the object according to a difference between the motion velocities of the object calculated respectively based on the reversely mapped images.

7. An electronic device, including the apparatus as described in any one of supplements 1-6.

8. A method for performing object detection based on images captured by a fisheye camera, the method including:

projecting original images captured by the fisheye camera onto a cylindrical or spherical projection model, and performing reverse mapping to obtain at least two reversely mapped images, angles of view of the at least two reversely mapped images being towards different directions;

detecting objects in the reversely mapped images respectively; and detecting the same object in the objects detected in the reversely mapped images.

9. The method according to supplement 8, wherein, in performing the reverse mapping, an offset related to a width and/or a height of an original image is set to be greater than a first value and less than the first value respectively, so as to obtain two reversely mapped images;

wherein, when the offset is equal to the first value, the angles of view face a center of the width and/or height of the original image.

10. The method according to supplement 8, wherein the detecting objects in the reversely mapped images includes:

performing detection based on a foreground and a background, and/or performing detection based on a classifier.

11. The method according to supplement 8, wherein the detecting the same object in the objects detected in the reversely mapped images includes:

for objects existing in overlapped regions of the reversely mapped images, mapping contour frames of the objects in the overlapped regions of the reversely mapped images into the original images to obtain mapped contour frames; and detecting a degree of overlapping of the mapped contour frames, and judging that the objects are the same object when the degree of overlapping is greater than a first threshold.

12. The method according to supplement 8, wherein the method further includes: detecting a motion state of the object according to a result of the detection.

13. The method according to supplement 12, wherein the detecting a motion state of the object includes:

when it is determined that the objects detected in the reversely mapped images are the same object, calculating motion velocities of the object respectively based on the reversely mapped images; and detecting the motion state of the object according to a difference between the motion velocities of the object calculated respectively based on the reversely mapped images.

What is claimed is:

1. An apparatus for performing object detection based on images captured by a fisheye camera, the apparatus comprising:

a memory;

a processor coupled to the memory and configured to:

project original images captured by the fisheye camera onto a cylindrical or spherical projection model, and perform reverse mapping to obtain at least two reversely mapped images corresponding to a same original image, angles of view of the at least two reversely mapped images being towards different directions, detect objects in the at least two reversely mapped images, respectively, and detect an object that is the same among the objects detected in the at least two reversely mapped images, wherein, in performing the reverse mapping, the processor sets an offset related to a width and/or a height of an original image among the original images, the offset being set to be greater than a value and less than the value respectively, so as to obtain the at least two reversely mapped images, wherein, when the offset is equal to the value, the angles of view face a center of the width and/or the height of the original image, wherein the processor is further configured to:

map, for objects existing in overlapped regions of the at least two reversely mapped images, contour frames of the objects in the overlapped regions of the at least two reversely mapped images into the original images to obtain mapped contour frames, and detect a degree of overlapping of the mapped contour frames, and determine that the object is the same when the degree of overlapping is greater than a threshold.

2. The apparatus according to claim 1, wherein, the processor performs detection on the at least two reversely mapped images based on a foreground and a background, and/or performs detection of the object based on a classifier obtained based on a training.

3. The apparatus according to claim 1, wherein the processor is further configured to:

detect a motion state of the object according to a result of the detection of the object.

4. The apparatus according to claim 3, wherein the processor is further configured to:

calculate, when determining that the objects detected in the at least two reversely mapped images are the object that is the same among the objects, motion velocities of the object respectively based on the at least two reversely mapped images, and detect the motion state of the object according to a difference between the motion velocities of the object calculated respectively based on the at least two reversely mapped images.

5. An electronic device, comprising the apparatus as claimed in claim 1.

6. A method for performing object detection based on images captured by a fisheye camera, the method comprising:

projecting original images captured by the fisheye camera onto a cylindrical or spherical projection model, and performing reverse mapping to obtain at least two reversely mapped images corresponding to a same original image, angles of view of the at least two reversely mapped images being towards different directions;

detecting objects in the at least two reversely mapped images, respectively; and detecting an object that is the same among the objects detected in the at least two reversely mapped images, wherein, in performing the reverse mapping, an offset related to a width and/or a height of an original image among the original images, the offset being set to be greater than a value and less than the value respectively, so as to obtain the at least two reversely mapped images;

wherein, when the offset is equal to the value, the angles of view face a center of the width and/or the height of the original image, wherein the detecting of the object that is the same among the objects detected in the at least two reversely mapped images comprises:

mapping, for objects existing in overlapped regions of the at least two reversely mapped images, contour frames of the objects in the overlapped regions of the at least two reversely mapped images into the original images to obtain mapped contour frames, and detecting a degree of overlapping of the mapped contour frames, and judging that the object is the same when the degree of overlapping is greater than a threshold.

* * * * *